United States Patent [19]

Sharp et al.

[11] Patent Number: 5,163,338

[45] Date of Patent: Nov. 17, 1992

[54] CABLE CORE LENGTH ADJUSTER MECHANISM

[75] Inventors: Harold L. Sharp, Union Lake; William F. Sultze, Oxford, both of Mich.

[73] Assignee: General Motors Corporation, Detroit, Mich.

[21] Appl. No.: 840,904

[22] Filed: Feb. 25, 1992

[51] Int. Cl.⁵ .............................................. F16C 1/10
[52] U.S. Cl. ........................ 74/502.4; 74/500.5; 74/501.5 R; 74/502.6; 403/104; 403/379
[58] Field of Search ............ 74/501.5 R, 500.5, 502.4, 74/502.6; 403/104, 106, 378, 379

[56] References Cited

U.S. PATENT DOCUMENTS

| | | | |
|---|---|---|---|
| 3,572,160 | 6/1969 | Stahr | 74/501 |
| 3,860,352 | 1/1975 | Carlson | 74/502.4 X |
| 4,366,725 | 1/1983 | Kondo | 74/502.4 |
| 4,458,552 | 7/1984 | Spease et al. | 74/502.4 |
| 4,805,479 | 2/1989 | Brightwell | 74/502.4 |
| 4,869,123 | 9/1989 | Stocker | 74/501.5 R |
| 4,887,930 | 12/1989 | Chaczyk et al. | 403/379 |
| 4,889,006 | 12/1989 | Kolinski et al. | 74/502.4 |
| 4,903,541 | 2/1990 | Shiota | 74/501.5 |
| 4,947,704 | 8/1990 | Gokee | 74/502.4 |
| 5,003,838 | 4/1991 | Pospisil et al. | 74/502.4 |
| 5,010,781 | 4/1991 | Kirk et al. | 74/502.4 |

Primary Examiner—Leslie A. Braun
Assistant Examiner—Andrea Pitts
Attorney, Agent, or Firm—Kevin M. Hinman

[57] ABSTRACT

A core length adjuster mechanism provides adjustment for a push-pull cable system having a core disposed within a conduit. The core and the conduit are flexible for much of their length, with the core being a rigid rod at the ends. An end of one of the rods is slidably disposed within a body of the adjuster mechanism. The body was generally rectangular shape, elongated in an axial direction. The body has a member for swivelable attachment integrated into it. The body has a rectangular opening through perpendicular to the axis from a top to a bottom. There are teeth transverse to the axis in the opening on sides paralleling the axis. A clip is disposed in the opening. The clip can be manually moved from an adjust position to an engaged position. It has teeth complementary to the teeth in the opening that engage those teeth when the clip is in an engaged position by pressing it into the body. When the clip is in the adjust position, the teeth are not engaged. In the adjust position, the clip is snapped over the rod end, axially engaging it in a circumferential groove of the rod end.

7 Claims, 2 Drawing Sheets

CABLE CORE LENGTH ADJUSTER MECHANISM

TECHNICAL FIELD

This invention relates to manually operated core length adjuster mechanisms for control cable systems having both a core and a conduit. More particularly, this invention relates to adjuster mechanisms for cable systems that are able to both push and to pull by having a rigid rod extending from an end of the conduit.

BACKGROUND OF THE INVENTION

Length adjuster mechanisms are commonly integrated into control cables used for push-pull applications. Such cables have a rod serving as the core at each end extending from the conduit. Adjuster mechanisms are widely used in control cables within automobiles, such as with transmission shift controls. Adjuster mechanisms serve as means of compensating for variation in distances between both mounting points of a cable core and mounting points of the corresponding cable conduit.

An option to providing an adjuster mechanism in the cable system is to provide a slot at either end of the cable system. The disadvantage of using a slot is in the amount of time required to assemble parts having slots. Typically a threaded fastener is used to achieve a clamping load necessary to prevent relative motion along the slot. Tightening a threaded fastener takes more time than does pushing in a snap-in type clip as is commonly used with cable systems having adjuster mechanisms.

Adjuster mechanisms are generally one of two types: a core length adjuster mechanism or a conduit length adjuster mechanism. Both change the effective length of the cable core.

Conduit adjuster mechanisms are commonly used, but tend to be large, making it difficult to package and install them in applications with limited space, such as in an engine compartment of a vehicle.

Conduit length adjuster mechanisms also present a potential for misadjustment whenever the cable routing is such that displacement of the conduit during adjustment is restricted. When the conduit cannot move freely, accurate adjustment is inhibited.

Known core length adjuster mechanisms are typically located at one of the ends of the cable core. More specifically, the adjuster mechanisms are at the end of the rod, or the rod end. The core length adjuster mechanisms generally integrate a swivelable attachment means, such as a socket for a ball and socket type arrangement, into the adjusting mechanism because the adjuster mechanisms are at one of the ends of the cable cores. Core length adjuster mechanisms are generally smaller than conduit type adjuster mechanisms, facilitating assembly operations where they are employed. Known core length adjuster mechanisms typically have a telescoping member molded to a rod end. The telescoping member is slidably disposed within a body into which the socket is integrated. A clip which is axially fixed relative to the body is used to lock the telescoping member to the body by pressing the clip into the body. A disadvantage of this arrangement is that it tends to result in a fairly long adjuster mechanism because the portion of the telescoping member with which the clip engages is disposed beyond the rod end. The engaging portion of the telescoping member extends forward in front of the rod end. Longer adjuster mechanisms increase the minimum required distance between the point where the conduit is fixed in place and a point of swivelable attachment for the rod end, thereby increasing packaging difficulties.

Another disadvantage of known core length adjuster mechanisms is that the telescoping member is permanently fixed to the rod end, usually by molding it to the rod end. This need to have the telescoping member fixed to the rod end increases the cost and complexity of manufacturing the cable system over what the cost would be if the telescoping member was not needed.

SUMMARY OF THE INVENTION

The present invention is a core length adjuster mechanism with just two parts required, a body and a clip. No telescoping member is required. The function of the telescoping member and the clip of the prior art are essentially integrated into the clip of the present invention.

It is an object of this invention to provide an improved manually operated core length adjuster mechanism not having a member permanently fixed to a rod end.

It is also an object of this invention to provide an improved manually operated core length adjuster mechanism having only two members.

It is a further object of this invention to provide an improved manually operated core length adjuster mechanism which allows an end of the cable conduit to be fixed to a mounting surface a relatively short distance from a point of swivelable attachment for the rod end.

It is a yet further object of this invention to provide an improved manually operated core length adjuster mechanism where restrictions on the movement of the conduit do not impede the function of the adjuster mechanism.

It is an even yet further object of this invention to provide a manually operated core length adjuster mechanism having an axially elongated, relatively rectangular body, the body having a rectangular opening from a top through a bottom, the opening having a plurality of teeth transverse to the axis on sides generally parallel to the axis, a swivelable attachment means being integrated into a first end of the body, the body having an aperture passing through a second end into the rectangular opening, a rod forming an end of the core slidably disposed within the aperture, a rod end of the rod disposed within the rectangular opening, and having a clip located within the rectangular opening and axially engaging the rod, the clip having teeth complementary to the teeth of the body, the clip being manually movable from an adjust position to an engaged position, the teeth of the clip and the teeth of the body being disengaged in the adjust position and meshing in the engaged position axially, the clip being axially movable within the rectangular opening when in the adjust position and being axially fixed to the body in the engaged position.

It is another object of this invention to provide a manually operated core length adjuster mechanism having an axially elongated, relatively rectangular body, the body having a rectangular opening from a top through a bottom, the opening having a plurality of teeth transverse to the axis on sides generally parallel to the axis, a swivelable attachment means being integrated into a first end of the body, the body having an aperture passing through a second end into the rectangular opening, a rod forming an end of the core slidably disposed within the aperture, a rod end of the rod disposed within the rectangular opening, and having a clip located within the rectangular opening and axially engaging the rod, the clip having teeth complementary to the teeth of the body, the clip being manually movable from an adjust position to an engaged position, the teeth of the clip and the teeth of the body being disengaged in the adjust position and meshing in the engaged position axially, the clip being axially movable within the rectangular opening when in the adjust position and being axially fixed to the body in the engaged position, with the teeth having chamfered tips to facilitate meshing of the teeth, and clip having a pair of tabs extending down from a cap portion on top of the clip, the tabs opposing each other across the body, the tabs each having a hook portion distal to the cap portion, the hook portion engaging the body when the clip is in the engaged position.

These and other objects and advantages will be more apparent from the following description and drawings.

DESCRIPTION OF THE PREFERRED EMBODIMENT

Figure 1:
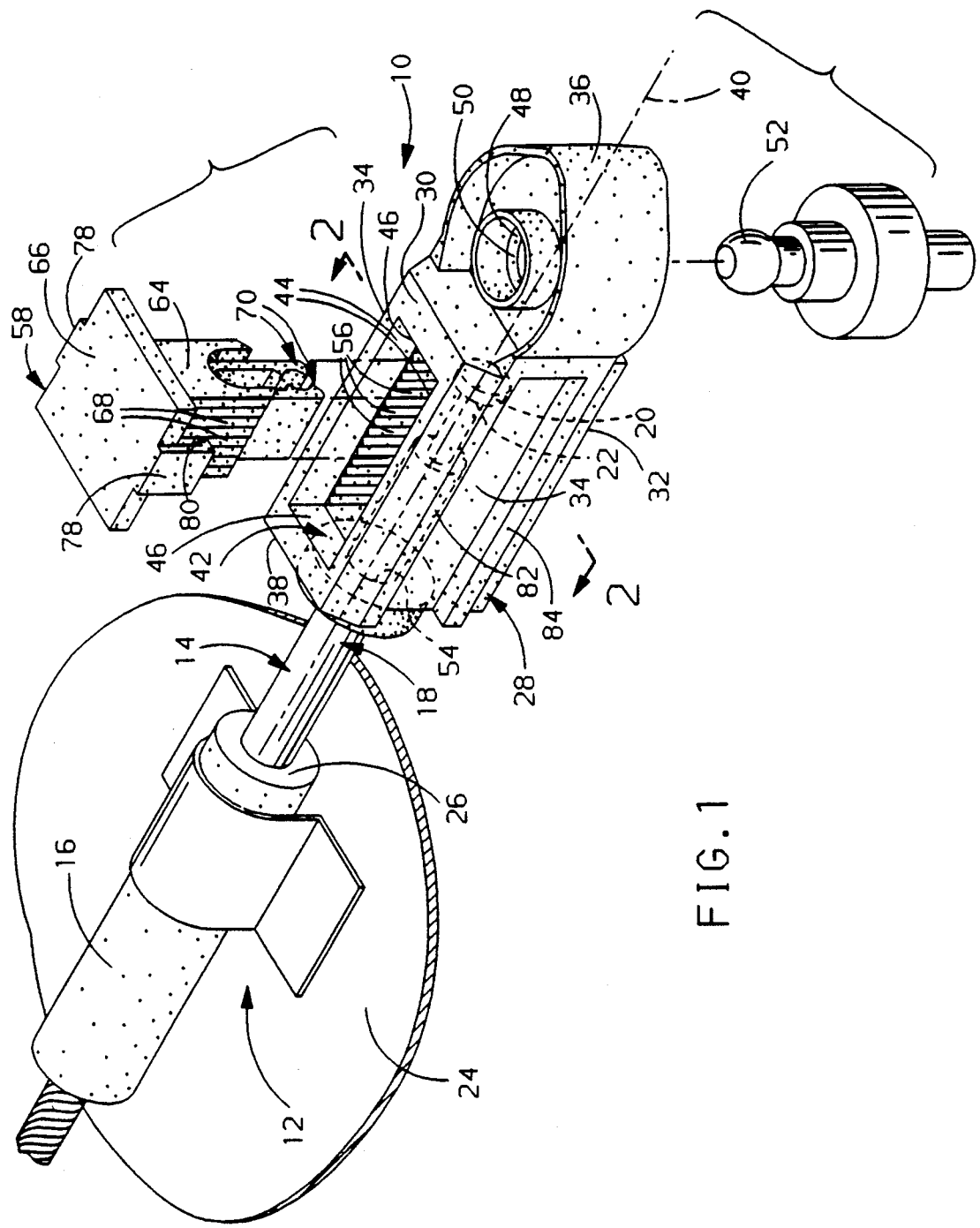
FIG. 1 shows a perspective exploded view of the adjuster mechanism with a ball member to which the adjuster mechanism attaches.
Figure 2:
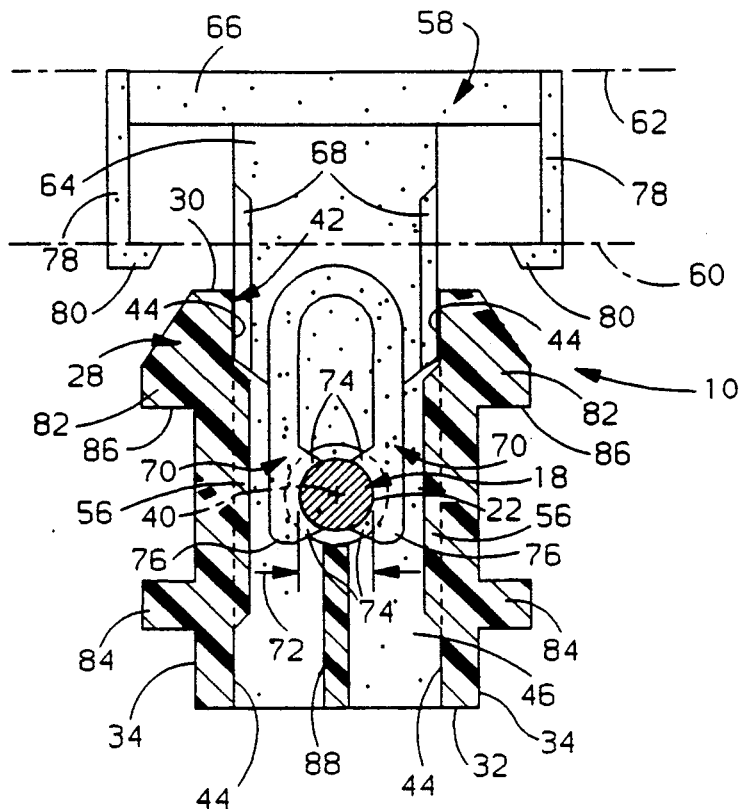
FIG. 2 shows a view in the direction of Arrows 2 of FIG. 1 with the clip in the adjust position.
Figure 3:
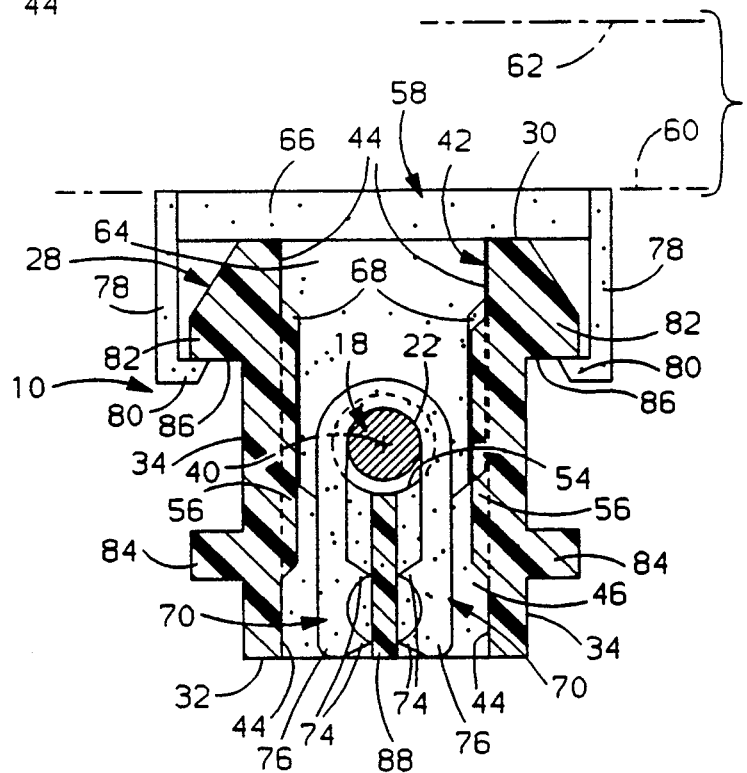
FIG. 3 shows a view in the direction of Arrows 2 of FIG. 1 with the clip in the engaged position.

A manually operated core length adjuster mechanism 10 is used with a cable system 12 having a core 14 disposed within a conduit 16. The conduit 16 is flexible for most of its length. The core 14 is likewise flexible for most of its length. An end 18 of the core 14, hereinafter referred to as a rod 18, is rigid and extends from the conduit 16. An end 20 of the rod 18 distal to the conduit 16, hereinafter referred to as a rod end 20, is distinguished from the rest of the rod 18 by a circumferential groove 22 in the rod 18 proximate to the rod end 20. The conduit 16 is fixed relative to a mounting surface 24 at a conduit end 26.

The cable system 12 is typically used in a control system, such as a motor vehicle transmission shift range control system (not shown). In such a system, the cable system 12 is functionally disposed between a transmission shifter (not shown) and a transmission range select arm (not shown), with the shifter being inside a vehicle and the transmission range select arm mounted to a shaft (not shown) extending from a transmission housing (not shown) within an engine compartment (not shown) of the vehicle.

The adjuster mechanism 10 has a body 28 with a generally parallelepiped shape which is generally rectangular, with a top 30 and a bottom 32, two sides 34, and a first end 36 and a second end 38. An axis 40 passes through the body 28 from the first end 36 of the body 28 to the second end 38 of the body 28. The body 28 is elongated in the direction of the axis 40.

A rectangular opening 42 passes through the body 28 from the top 30 to the bottom 32. The opening 42 has two sides 44 and two ends 46 within the body 28. The opening sides 44 are parallel to the sides 34 of the body 28. The first end 36 of the body has a socket 48 for a ball and socket type joint serving as means for a swivelable attachment. The socket 48 is provided by a flexible insert 50 at the first end 36, permitting the first end 36 of the body 28 to be snapped over a ball member 52 fixed to the range select arm. The ball member 52 serves as a point of swivelable attachment to the range select arm. The second end 38 of the body 28 has an aperture 54 in the body 28, approximately coaxial with the axis 40, passing from the second end 38 of the body 28 to the rectangular opening 42. The rod 18 slidably passes through the aperture 54 with the circumferential groove 22 disposed within the rectangular opening 42. Both sides 44 of the rectangular opening 42 have a plurality of teeth 56 transverse to the axis 40.

A clip 58 is located in the rectangular opening 42 in the body 28. The clip 58 is manually movable relative to the body 28 between an engaged position 60 and an adjust position 62. The clip 58 has a block portion 64 and a cap portion 66 on top of the block portion 64. The clip 58 projects above the top 30 of the body 28 when in the adjust position 62. The cap portion 66 contacts the top 30 of the body 28 in the engaged position 60.

The block portion 64 has teeth 68 complementary to the teeth 56 of the body 28. The teeth 68 of the clip 58 and the teeth 56 of the body 28 are meshed when the clip 58 is in the engaged position 60. This meshing axially fixes the clip 58 to the body 28. The teeth 68 of the clip 58 and the teeth 56 of the body 28 are disengaged when the clip 58 is in the adjust position 62. Tips of the teeth 56, 68 of both the body 28 and the clip 58 are chamfered to facilitate the meshing of the teeth 56 and 68 of the body 28 and the clip 58.

The block portion 64 is axially shorter than the sides 44 of the opening 42 in the body 28, thereby allowing the clip 58 to translate axially in the opening when in the adjust position.

The block portion 64 has a pair of tines 70 extending away from the cap portion 66. The tines 70 are opposed across the rod 18 from each other in both the engaged 60 and the adjust 62 positions. The tines 70 are partially disposed within the circumferential groove 22 of the rod 18, thereby axially fixing the clip 58 to the rod 18. The tines 70 are disposed in parallel relation and spaced approximately equal to a thickness 72 of the rod 18 at the circumferential groove 22.

The tines 70 have a pair of nubs 74 near a tip 76 of each tine 70, one nub 74 being closer to the tip 76 than the other nub 74. The nubs 74 on each tine 70 are opposed to the nubs 74 on the other tine 70. The opposing nubs 74 are separated by less than the thickness of the rod at the circumferential groove. The nubs 74 radially position the clip 58 relative to the rod 18 and thereby position the clip 58 relative to the body 28 in the adjust position 62. The tines 70 elastically deflect to allow the clip 58 to be manually moved from the adjust position 62 to the engaged position 60.

The cap portion 66 has two tabs 78 extending toward the body 28 approximately parallel with the tines 70. The tabs 78 oppose each other across the body 28. The tabs 78 each have a hook portion 80 distal to the cap portion 66 projecting inboard toward the body 28. The hook portion 80 engages the body 28 when the clip 58 is in the engaged position 60.

The body 28 has an upper 82 and a lower 84 longitudinal rib on each side 34 of the body 28. These ribs 82, 84 stiffen the body 28 to help prevent buckling and bending when subjected to axial compressive loading. The upper ribs 82 also serve to provide reaction surfaces 86 for the hook portions 80 of the tabs 78.

The body 28 also has a center rib 88 in the opening 42, approximately aligned with the axis 40. The center rib extends up inside of the opening 42 from the bottom 32 of the body 28 to the aperture 54 through the second end 38 of the body 28. The center rib 88 fits between the opposing nubs 74 of the tines 70 when the clip is in the engage position.

The advantages of this invention are made more apparent by the following description of the operation of the invention.

The transmission is placed in a selected gear range. The shift control is placed in a corresponding position.

An end of the cable system (not shown) opposite the adjuster mechanism 10 is attached to the transmission shifter. The clip 58 is placed in the adjust position 62. With the clip 58 in either the adjust position 62 or the engaged position 60, the rod end 20 cannot be removed from the body 28. The socket 48 of the body 28 is snapped over the ball member 52 on the transmission range select arm. The shifter and the transmission range select arm are positioned in their optimal relative positions.

The clip 58 is then pushed down into the engaged position 60, engaging the teeth 68 of the clip 58 with the teeth 56 of the body 28. As the clip 58 is pushed down, any tendency of the rod end 20 to be displaced downward is resisted by the center rib 88. As the cap portion 66 of the clip 58 seats against the body 28, the hook portions 80 of the tabs 78 snap over the upper longitudinal ribs 82 on the sides 34, securing the clip 58 to the body 28. With the clip axially fixed to both the rod and the body, displacement and force can now be transmitted from the shifter to the transmission range select arm through the cable system 12.

Many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A manually operated core length adjuster mechanism for use with a cable system having a core and a conduit, an end of the conduit being fixed to a mounting surface, the core slidably disposed within the conduit, an end of the core being a rod extending beyond the end of the conduit, a distal end of the rod being a rod end made distinguishable from the rest of the rod by a circumferential groove in the rod, the adjuster mechanism comprising:

a body with an elongated generally parallelepiped shape being generally rectangular, with a top and a bottom, two sides, and a first end and a second end, having an axis passing through the body from the first end of the body to the second end of the body, the body being elongated in an axial direction parallel to the axis, a rectangular opening passing through the body from the top of the body to the bottom of the body, the opening having two sides and two ends within the body with the sides of the opening being parallel to the sides of the body, the first end of the body having means for swivelable attachment, the second end of the body having an aperture in the body passing from the second end of the body to the rectangular opening, the aperture being approximately coaxial with the axis, the rod slidably passing through the aperture with the circumferential groove disposed within the rectangular opening, one of the sides of the rectangular opening having a plurality of teeth transverse to the axis; and a clip, being located in the rectangular opening in the body, being manually movable relative to the body between an engaged position and an adjust position, having a cap portion on top of a block portion, the clip projecting above the top of the body in the adjust position and the cap portion contacting the top of the body in the engaged position, the block portion having teeth complementary to the teeth of the body, the teeth of the body and the teeth of the clip being meshed and thereby axially fixing the clip to the body when the clip is in the engaged position, the teeth of the body and the teeth of the clip being disengaged when the clip is in the adjust position, the block portion being shorter than the sides of the opening thereby allowing the clip to translate axially in the opening when in the adjust position, the block portion having a pair of tines extending away from the cap portion, the tines being opposed across the rod from each other in both the engaged and adjust positions, the tines being partially disposed within the circumferential groove of the rod thereby axially fixing the clip to the rod, the tines being disposed in parallel relation and spaced approximately equal to a thickness of the rod at the circumferential groove, the tines having a pair of nubs near a tip of each tine, one closer to the tip than the other, the nubs on each tine being opposed to the nubs on the other tine, the opposing nubs being separated by less than the thickness of the rod at the circumferential groove, the nubs radially positioning the clip relative to the rod and thereby positioning the clip relative to the body in the adjust position, the tines elastically deflecting to allow the clip to be manually moved from the adjust position to the engaged position.

2. A manually operated core length adjuster mechanism for use with a cable system as described in claim 1, the means for swivelable attachment being provided by a socket for a ball and socket type joint.

3. A manually operated core length adjuster mechanism for use with a cable system as described in claim 2, further comprising:

the body having teeth on both sides of the opening; and the block portion of the clip having teeth complementary to the teeth on both sides of the opening in the body.

4. A manually operated core length adjuster mechanism for use with a cable system as described in claim 3, further comprising:

two tabs extending from the cap portion of the clip toward the body approximately parallel with the tines, the tabs opposing each other across the body, the tabs each having a hook portion distal to the cap portion, the hook portion projecting inboard toward the body, the hook portion engaging the body when the clip is in the engaged position.

5. A manually operated core length adjuster mechanism for use with a cable system as described in claim 4, further comprising:

a longitudinal rib on each side of the body providing a reaction surface for the hook portion of the tab.

6. A manually operated core length adjuster mechanism for use with a cable system as described in claim 5, further comprising:
a center rib in the opening in the body connecting the two ends of the opening, being approximately aligned with the axis, extending upward inside of the opening from approximately the bottom of the body up to the aperture through the body, fitting between the opposing nubs of the tines.

7. A manually operated core length adjuster mechanism for use with a cable system as described in claim 5, further comprising:
the teeth of the body and the teeth of the clip having chamfered tips facilitating meshing of the teeth.

* * * * *